US012643452B2

(12) United States Patent
Rudolf et al.

(10) Patent No.: US 12,643,452 B2
(45) Date of Patent: Jun. 2, 2026

(54) ASSEMBLY FOR PROVIDING A FASTENING POSSIBILITY FOR A VEHICLE COMPONENT

(71) Applicant: Illinois Tool Works Inc., Glenview, IL (US)

(72) Inventors: Andreas Rudolf, Eibelstadt (DE); Zsolt Wilke, Bad Mergentheim (DE)

(73) Assignee: Illinois Tool Works Inc., Glenview, IL (US)

( * ) Notice: Subject to any disclaimer, the term of this patent is extended or adjusted under 35 U.S.C. 154(b) by 364 days.

(21) Appl. No.: 18/222,766

(22) Filed: Jul. 17, 2023

(65) Prior Publication Data

US 2024/0025325 A1 Jan. 25, 2024

(30) Foreign Application Priority Data

Jul. 22, 2022 (DE) ..................... 10 2022 118 397.1

(51) Int. Cl.
B60N 3/02 (2006.01)
B60R 13/02 (2006.01)
(52) U.S. Cl.
CPC .......... B60N 3/026 (2013.01); B60R 13/0206 (2013.01)
(58) Field of Classification Search
CPC ... B60N 3/026; B60R 13/0206; B60R 21/217; F16B 19/1081; F16B 21/086; F16B 21/065; F16B 5/0642
USPC ........................................................ 24/297
See application file for complete search history.

(56) References Cited

U.S. PATENT DOCUMENTS

| | | | | | |
|---|---|---|---|---|---|
| 5,560,575 | A | * | 10/1996 | Krysiak | .............. F16B 19/1081 248/222.12 |
| 5,658,110 | A | * | 8/1997 | Kraus | ................... F16B 21/086 411/908 |
| 5,697,140 | A | * | 12/1997 | Crotty, III | .............. B60J 3/0221 29/434 |
| 7,103,939 | B2 | * | 9/2006 | Belchine, III | ......... B60N 3/023 16/412 |
| 7,237,995 | B2 | * | 7/2007 | Randez Perez | ..... F16B 19/1081 411/48 |
| 8,495,802 | B2 | * | 7/2013 | Okada | ................. B60R 13/0206 24/453 |

(Continued)

FOREIGN PATENT DOCUMENTS

EP 1084908 A2 3/2001

*Primary Examiner* — Jason S Morrow
(74) *Attorney, Agent, or Firm* — McAndrews, Held & Malloy, Ltd.

(57) ABSTRACT

An assembly includes a connecting element, a retaining element and a locking and/or blocking element. The locking and/or blocking element includes a land region extending in the insertion direction, including two opposing finger and/or wing elements that are radially projecting from the land region. A base body of the retaining element includes a passage extending in the longitudinal direction of the base body, wherein the land region is receivable with the finger or wing elements projecting from the land region. The passage includes a first guide system formed to guide the finger or wing elements upon insertion of the land region into the passage or into the recess of the base body, and a second guide system which is formed to guide the finger or wing elements when the land region is guided out of the passage or out of the recess of the base body.

15 Claims, 12 Drawing Sheets

(56)  References Cited

U.S. PATENT DOCUMENTS

| | | | | |
|---|---|---|---|---|
| 8,695,177 | B2 * | 4/2014 | Kato | F16B 21/065 |
| | | | | 24/297 |
| 9,889,783 | B2 * | 2/2018 | Yang | B60N 3/026 |
| 12,110,917 | B2 * | 10/2024 | Leidig | F16B 21/086 |
| 12,385,513 | B2 * | 8/2025 | Matthes | F16B 5/0664 |
| 2006/0049651 | A1 * | 3/2006 | Selvini | B60R 13/0212 |
| | | | | 296/214 |
| 2016/0040705 | A1 * | 2/2016 | Peter | F16B 21/02 |
| | | | | 403/348 |
| 2024/0026915 | A1 * | 1/2024 | Kukuczka | F16B 21/065 |
| 2024/0084836 | A1 * | 3/2024 | Kukuczka | B60N 3/026 |
| 2025/0115176 | A1 * | 4/2025 | Kukuczka | B60N 3/023 |

* cited by examiner

ASSEMBLY FOR PROVIDING A FASTENING POSSIBILITY FOR A VEHICLE COMPONENT

RELATED APPLICATION(S)

The present application claims the benefit of German Patent Application No. 10 2022 118 397.1, filed Jul. 22, 2022, the contents of which are hereby incorporated by reference.

BACKGROUND

The present disclosure relates generally to a fastening possibility for fastening a vehicle component, in particular an interior component of a vehicle, to a body component. The vehicle component is in particular a vehicle grab handle or an airbag.

Vehicle grab handles are provided in passenger cars, trucks, and sports cars for the purpose of providing support to occupants upon entering and exiting the vehicle. Vehicle grab handles can be static or dynamic. Dynamic grab handles can be moved between an extended position and a retracted position. Static grab handles, on the other hand, are fixedly attached, for example to the headliner of a vehicle. Typically, vehicle grab handles are supplied parts, which are then mounted to a vehicle body in the simplest possible manner.

A wide variety of designs for vehicle grab handles are known. Currently available vehicle grab handles can be attached to the roof through the headliner or can be attached to one of the roof support pillars, which are known as the A, B, or C-pillar, either directly or via a trim part. The A-pillar is the roof support pillar located between the windshield and the window of the first row of seats. The B-pillar is the roof support pillar between the front and rear door or, in a coupé, the pillar which is located behind the doors of the vehicle. The C-pillar is the roof support pillar located between the rear door and the taillight of the vehicle.

The fastening/fastening of vehicle grab handles is usually carried out by means of a snap-in process. For this purpose, at least one fastening clip of the vehicle grab handle is commonly inserted into a provided fastening opening of a vehicle body component and fastened there. It is customary to cover the region of the fastening opening with cover caps or similar covers, so that it is no longer visible from the interior of the vehicle. The vehicle grab handles or the handle pieces belonging to the vehicle grab handles can be arranged in handle recesses provided for this purpose, so that a substantially flush surface is obtained and the handle piece of the vehicle grab handle can nevertheless be grabbed comfortably.

To fasten a vehicle grab handle to a vehicle body component, it is known, for example from patent publication EP1084908A2, to insert a screw through an opening of the grab handle, wherein a fastening clip having a passage opening is inserted through openings of the grab handle and the headliner. At the end of the passage opening, there is a short piece of internal threading, which accommodates the screw in the pre-assembly position. By means of the fastening clip, which is supported on the rear of the headliner, and the screw, the grab handle and the headliner are held together in the pre-assembly unit in the pre-assembly position. In order to accommodate the screw, a weld nut is provided on the vehicle frame or body-side mounted portion formed as the base part.

In this approach according to the prior art, however, the fact that, for the final assembly of the pre-assembly unit, an additional component is required as a third fastening element, which must be attached in a laborious separate work step, has proven to be disadvantageous. Due to the positionally fixed attachment of the weld nut, a tolerance-based deviation of the screw-on points on the pre-assembly unit on the body-side mounted portion cannot be compensated. Additional solutions for accommodating tolerances on the trim part must therefore be realized. The screw-on point on the vehicle frame must likewise be located in an accessible location, wherein it is technically possible to attach the weld nut. In principle, with the bolting of a vehicle grab handle to the vehicle body that is currently still customary, the fastening effort is relatively high.

In light of the situation described above, the underlying problem of the present disclosure is to specify a fastening possibility for a vehicle component, in particular an interior component, to a body component, wherein the vehicle component, which is in particular a vehicle grab handle or an airbag, can be fastened to the body component in a particularly easy-to-implement manner, wherein the interior component can be fastened to the body component at least with reduced play and preferably without play, even in case of different sheet thicknesses of the body component and/or in case of tolerance-based deviations.

SUMMARY

The present disclosure relates generally to forming connection between vehicle components, substantially as illustrated by and described in connection with at least one of the figures, as set forth more completely in the claims. More specifically, the present disclosure relates to an optimized fastening possibility, in particular for fastening a vehicle grab handle or an airbag to a body-side mounted portion, in particular in the automotive sector. The body-side mounted portion is also referred to here as a "vehicle body component." In particular, a lasting, high-quality connection between the vehicle component, for example the vehicle grab handle, and the vehicle body is to be achievable with as little fastening effort as possible.

DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
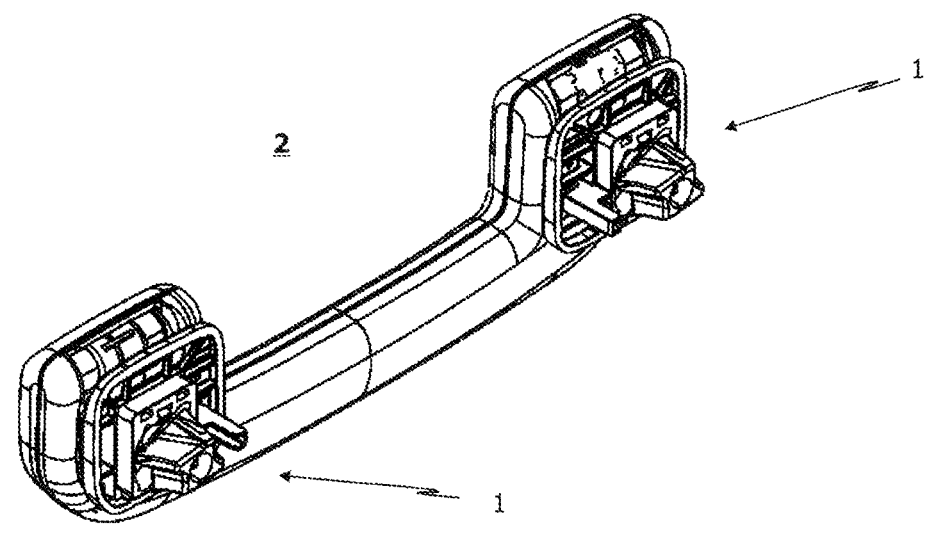
FIG. 1 illustrates, schematically and in an isometric view, an exemplary embodiment of the assembly according to the disclosure for fixing an inner vehicle handle.
Figure 2:
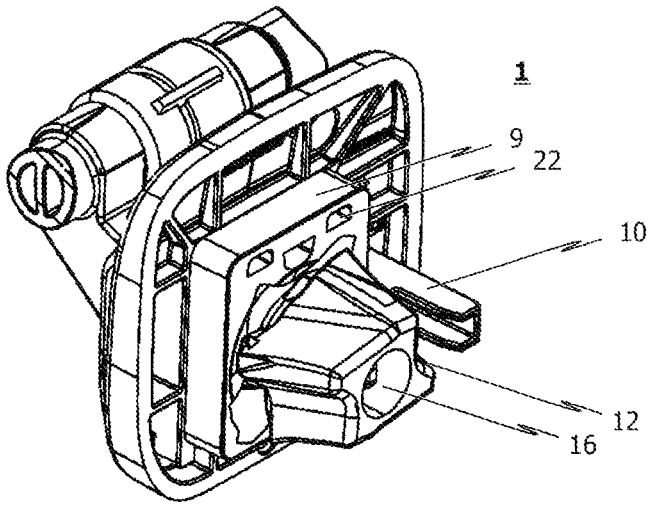
FIG. 2 illustrates, schematically and in an isometric view, the fastening assembly used to fix the inner vehicle handle according to FIG. 1.
Figure 3:
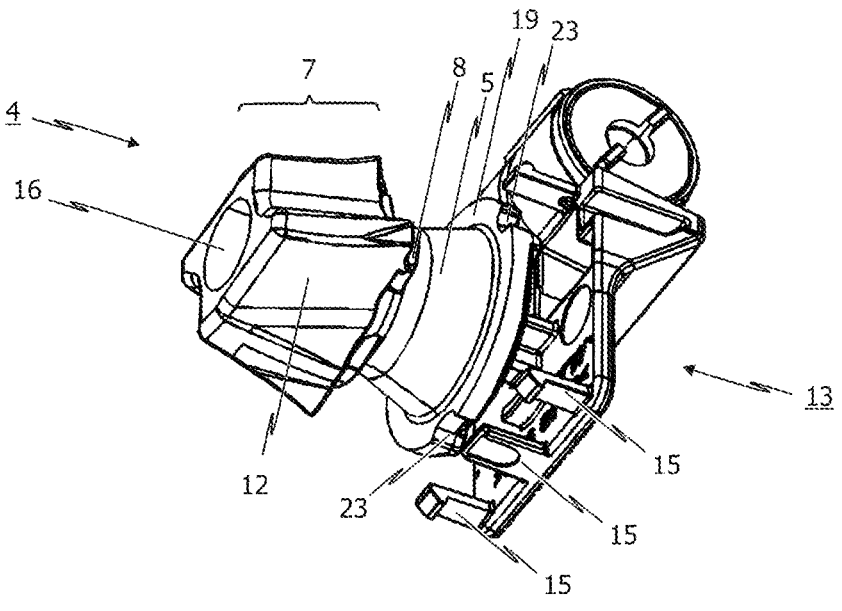
FIG. 3 illustrates, schematically and in an isometric view, the retaining element with the locking and/or blocking element of the assembly according to FIG. 2.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

Specifically, a fastening possibility for a vehicle component is to be provided that allows for intuitive fastening. The fastening possibility is to be designed in particular as a retaining clip, which can be mounted in an easily implemented manner without the skill, experience and capability of the assembler being decisive. Disassembly should also be possible.

Accordingly, the disclosure relates in particular to an assembly for providing a fastening possibility for a vehicle component, in particular an interior component, to a body component, wherein the assembly is in particular designed as a torsion clip.

In structural terms, the assembly comprises a connecting element preferably made of a plastic material, with which the vehicle component, for example the door grab handle or an airbag component, can be connected.

The assembly further comprises a retaining element, preferably made of a plastic material, for retaining the connecting element on the body component.

The retaining element comprises a base body with a retaining region at a first end region of the base body. The connecting element comprises a base body with a receptacle opening, through which the retaining element, and in particular the retaining region of the retaining element, can be received at least in some areas in the insertion direction or through which the retaining element and in particular the retaining region of the retaining element can be inserted at least in some areas in the insertion direction.

The solution according to the disclosure is characterized in particular in that the assembly further comprises a locking and/or blocking element preferably made of a plastic material for fixing a position and/or orientation of the retaining element in relation to the connecting element.

The locking and/or blocking element comprises a land region extending in the insertion direction, wherein the land region preferably comprises two opposing finger and/or wing elements that are radially projecting from the land region. On the other hand, the base body of the retaining element comprises a passage extending in the longitudinal direction of the base body or a recess extending in the longitudinal direction of the base body, wherein passage or recess the land region of the locking and/or blocking element with the finger or wing elements projecting from the land region can be received or is received at least in part or in some areas. The passage or recess of the base body of the retaining element comprises a first guide system which is designed to guide the finger or wing elements of the locking and/or blocking element when inserting the land region into the passage or recess of the base body of the retaining element.

Further, the passage or recess of the base body of the retaining element comprises a (further) second guide system which is designed to guide the finger or wing elements of the locking and/or blocking element when the land area is guided out of the passage or recess of the base body of the retaining element.

This special construction of the locking and/or blocking element allows for fixation of the retaining element in its mounted state. Herein the finger or wing elements projecting from the land region are present in the first guide system. To disassemble the assembly or to disassemble the retaining element, the finger or wing elements of the locking and/or blocking element are transitioned into the second guide system.

According to preferred implementations of the assembly according to the disclosure, it is provided that the first guide system comprises two interior groove regions opposite to one another and embodied in the inner wall of the passage or in the inner wall of the recess of the base body of the retaining element, wherein at least one of the two finger or wing elements of the locking and/or blocking element can respectively be received.

Alternatively or in addition, it is conceivable that the second guide system also comprises two interior groove regions opposite to one another that are formed in the inner wall of the passage or in the inner wall of the recess of the base body of the retaining element, in each of which one of the two finger or wing elements of the locking and/or blocking element can be accommodated at least partially or in some areas.

Preferably, the first guide system comprises a first region and a second region connected to the first region via a projection provided in the first guide system. The first and second areas as well as the projection of the first guide system are designed such that, when the land area is inserted into the passage or into the recess of the base body of the retaining element, the two finger or wing elements of the locking and/or blocking element initially follow the guide of the first area of the first guide system, wherein, for the transition into the second area of the first guide system, the finger or wing elements of the locking and/or blocking element must be moved radially inwards with respect to the land area.

In a conceivable realization of the last-mentioned embodiment, it is provided that the land region, in particular in the region of the two finger or wing elements, is formed elastically such that—at least over a predefined or definable distance—which is in particular sufficient to overcome the projection between the first and second region of the first guide system—the two finger or wing elements can move towards each other in a radial direction, as viewed in relation to the direction of extension of the land region.

The second guide system, on the other hand, is preferably arranged without a projection in one of the interior groove regions.

To elastically form the land region, the land region can comprise a window region, in particular in the region of the two finger or wing elements.

The first guide system of the passage or recess of the base body of the retaining element is connected to the second guide system of the passage or recess of the base body of the retaining element via a bevel that is inclined in particular towards the interior groove regions of the second guide system, via which, when transitioning the finger or wing elements of the locking and/or blocking element from the first guide system to the second guide system, the finger or wing elements of the locking and/or blocking element are guided with simultaneous torsion of the land area of the locking and/or blocking element.

The assembly according to the disclosure is characterized in particular in that it can be transitioned from a pre-assembly or delivery state, wherein the retaining region of the retaining element is not yet inserted through a fastening opening in the body component, i.e. a state wherein the assembly is provided by the supplier, into a pre-fixation state, wherein the retaining region of the retaining element is inserted through the fastening opening of the body component, and an edge region of the body component surrounding the fastening opening is received at least in some areas between the retaining region of the retaining element and the base body of the connecting element.

In order to transition the assembly from its pre-assembly or delivery state into its pre-fixation state, a torque is exerted on at least the retaining region of the retaining element such that, starting from a basic state, at least the retaining region of the retaining element is twisted in relation to the connecting element and in relation to the fastening opening of the body component in order to allow a passage of the retaining region through the fastening opening of the body component.

After the passage of the retaining element through the fastening opening of the body component, the torque previously exerted on the retaining region is at least partially nullified, and the retaining region is again in its basic state.

The assembly according to the disclosure is thus characterized in that, for fastening the assembly on the body component, it must only be inserted into the fastening opening of the body component. The assembly therein "automatically" transitions from its pre-assembly or delivery state into its pre-fixation state. The assembly can thus be mounted to the body component with simple hand movements. In particular, no tools are required for this purpose.

Moreover, because the assembly is provided in its pre-assembly or delivery state by the supplier, it is not necessary to properly assemble the individual components of the assembly during final assembly.

Overall, a simplified assembly of the assembly, which is embodied in particular as a torsion clip, is thus possible.

According to realizations of the present disclosure, it is provided that the retaining element can be twisted in relation to the connecting element about an axis of rotation extending in the insertion direction of the retaining element, namely: from a first rotational position of the retaining element, wherein the retaining element is connectable to the connecting element for putting together the assembly, into a second rotational position of the retaining element, wherein the retaining element is connected to the connecting element and the assembly is in its pre-assembly or delivery state or in its pre-fixation state; and from the second rotational position of the retaining element into a third rotational position of the retaining element, wherein the retaining element is located when the retaining region passes through the fastening opening of the body component.

The assembly according to this aspect of the disclosure can further be transitioned from its pre-fixation state to a fixed state, wherein the retaining portion of the retaining element inserted through the fastening opening of the body component exerts a force that acts against the direction of insertion on the edge region of the body component surrounding the fastening opening at least in some areas, thereby fixing the connecting element to the body component.

In order to transition the assembly from its pre-fixation state into its fixed state, according to embodiments of the disclosure, the retaining element is further twisted from its rotational position in relation to the connecting element into a fourth rotational position.

In order to ensure that, even in the case of different sheet thicknesses of the body component and/or tolerance-based deviations, the assembly or connecting element of the assembly is fastened on the body component in a manner that reduces play and has as little play as possible, it is provided according to embodiments of the disclosure that the retaining element, and in particular the retaining region of the retaining element, is associated with at least one, in particular wedge-shaped or ramp-shaped, clamping region, which—when the assembly is transitioned into its fixed state, and in particular when the retaining element is twisted from its second rotational position into its fourth rotational position—is rotated into a region between the retaining element that forms a gap in particular, in particular the retaining region of the retaining element, and the edge region of the body component surrounding the fastening opening of the body component, in particular by exerting a leverage effect.

Herein it is preferably provided that the base body of the connecting element preferably comprises a base region, which is preferably adapted at least in some areas to the size and/or geometry of the fastening opening of the body component, and which is received at least in some areas in the fastening opening of the body component in the pre-fixation state and in the fixed state of the assembly.

In this context, it is provided in particular that the base region is preferably designed to be elastically deformable at least in some areas in the insertion direction, or that it comprises corresponding regions that are elastically deformable at least in some areas in the insertion direction. This is to ensure that the base region or the elastically deformable area of the base region is elastically deformed or elastically deformable at least in part or in whole when the clamping area, which is in particular wedge-shaped or ramp-shaped, is screwed in, due to the leverage effect that is exerted as a result. This provides an easy-to-implement, but nonetheless simple possibility for fastening the connecting element to the body component without play, in case of different sheet thicknesses and/or tolerance-based deviations.

According to implementations of the assembly according to the disclosure, it is preferably provided that the connecting element comprises alignment means for aligning the connecting element and the retaining element inserted into the opening of the base body of the connecting element in relation to the fastening opening of the body component. The alignment means are in particular designed in order to realize an alignment of the connecting element in relation to the fastening opening of the body component according to the poka-yoke principle.

In this context, it is conceivable, for example, that the retaining region of the retaining element has a geometry, in particular cross-sectional geometry, and/or size, that is adjusted with respect to the fastening opening of the body component such that, in the state of being aligned with respect to the fastening opening of the body component, the retaining region of the retaining element is only insertable in its state of being twisted out of the basic state through the fastening opening of the body component.

In this context, it is conceivable that the retaining region of the retaining element preferably comprises at least one guide surface, in particular an outer circumferential guide surface, which is formed to generate a corresponding torque for rotating the retaining region from a basic state when the assembly is transitioned from its pre-assembly or delivery state to its pre-fixing state and when the retaining region is inserted into the fastening opening of the body component in the insertion direction in relation to the body component.

Preferably, the assembly further comprises the already mentioned locking and/or blocking element, preferably made of a plastic material, for establishing a location and/or position of the retaining element in relation to the connecting element.

The locking and/or blocking element should preferably comprise at least one latching means for preferably releasably latching the locking and/or blocking element, at least in its second state.

As already stated, the assembly according to the disclosure can preferably be transitioned from its pre-fixation state into a fixed state, wherein the retaining region of the retaining element inserted through the fastening opening of the body component exerts a force, which acts on the edge region of the body component surrounding the fastening opening at least in some areas counter to the insertion direction, in order to fix the connecting element to the body component.

In this context, it is preferably provided that when transitioning the assembly from its pre-fixation state to its fixed state as well as in the fixed state of the assembly, the finger or wing elements of the locking and/or blocking element overcome the projection provided in the first guide system and transition to the second area of the first guide system.

The base body of the retaining element is preferably arranged in a rotationally symmetrical manner at least in some areas, wherein a crown region, designed in particular to be annular in at least in some areas, is preferably formed at a second end region of the base body opposite to the first end region, wherein a fitted region is formed between the crown region and the retaining region of the retaining element.

Preferably, the base body of the connecting element comprises a support surface adapted at least in some areas to the geometry and/or size of the crown region such that, at least in the pre-assembly or delivery state of the assembly and preferably also in the pre-fixation state of the assembly, the crown region of the retaining element rests on the support surface of the connecting element, at least in some areas.

In this context, it is conceivable that at least one recess is formed in the crown region of the retaining element, wherein the connecting element comprises a region designed to be at least in some areas complementary to the at least one recess of the crown region and protruding in the direction of the receptacle opening of the connecting element, which region is formed such that, in the first rotational position of the retaining element and preferably only in the first rotational position of the retaining element, the retaining element is connectable to the connecting element such that the crown region of the retaining element rests on the support surface of the connecting element, at least in some areas.

In this context, it is preferably provided that the at least one region protruding in the direction of the receptacle opening of the connecting element is arranged offset from the plane wherein the crown region of the retaining element lies, in particular such that the at least one region protruding in the direction of the receptacle opening of the connecting element blocks a release of the connection between the retaining element and the connecting element in the second rotational position of the retaining element.

Accordingly, a concept based on the poka-yoke principle is also employed here in order to pre-assemble the assembly, i.e. to transition the assembly into its pre-assembly or delivery state.

According to a further aspect of the present disclosure, this assembly for providing a fastening possibility for a vehicle component, in particular an interior component such as a vehicle grab handle, is related to a body component, wherein the assembly preferably comprises a connecting element made of a plastic material, to which the vehicle component is connectable. The assembly further comprises a retaining element, preferably made of a plastic material, for retaining the connecting element to the body component.

The assembly according to the second aspect of the disclosure is characterized in particular in that the retaining element comprises a base body with a retaining region at a first end region of the base body, wherein the connecting element comprises a base body with a receptacle opening, through which the retaining element and in particular the retaining region of the retaining element are insertable at least in some areas.

The assembly according to the second aspect of the present disclosure can be transitioned from a pre-assembly state, wherein the retaining region of the retaining element is insertable or inserted through a fastening opening in the body component, into a fixed state, wherein the retaining region of the retaining element inserted through the fastening opening of the body component exerts a force, which acts on the edge region of the body component surrounding the fastening opening at least in some areas counter to the insertion direction in order to fix the connecting element to the body component.

Preferably, the assembly further comprises a locking and/or blocking element, preferably made of a plastic material, for establishing a position of the retaining element in relation to the connecting element.

The locking and/or blocking element can be transitioned from a first state, wherein the assembly is in its pre-assembly state, into a second state, wherein the assembly is in its fixed state.

The assembly comprises at least one element formed in order to, when the locking and/or blocking element is transitioned from its first state into its second state, translate an in particular linear movement of the locking and/or blocking element in relation to the connecting element into a rotational movement of the retaining element in relation to the connecting element in order to transition the assembly into its fixed state.

The assembly according to the first and second aspects of the present disclosure is preferably formed entirely from a plastic material.

It is characterized by its constructively simple manufacture and can be achieved, for example, by a common injection-molding process for the retaining element and/or the connecting element.

In the following, with reference to the drawings, an embodiment of the fastening assembly 1 according to the disclosure is described.

While the exemplary embodiments of the fastening assemblies 1 shown in the drawings are described in connection with a grab handle 2, the use of the fastening assembly 1 is not limited to this application. Rather, the fastening assembly 1 according to the disclosure is suitable for providing a fastening possibility for any vehicle component 2, in particular an interior component, onto a body component 100. An example in this regard is fastening, for example, of airbags or other interior components, in particular.

The body component 100 is preferably a sheet metal part. Again, this is not to be construed as limiting. Other body components, in particular interior skin components of the vehicle, can be considered.

The fastening assembly 1 according to the disclosure is characterized in particular in that all components of the assembly 1 are formed from a plastic material. The individual components of the fastening assembly 1 are in particular designed as plastic injection-molding parts.

The fastening assembly 1 can in particular be mounted without tools, wherein the fastening assembly 1 is delivered in a pre-assembly or delivery state into the vehicle manufacturer.

In order to mount the fastening assembly 1, it is insertable into a fastening opening 101 of the body component 100, wherein, during the insertion operation, the fastening assembly 1 first self-transitions from its pre-assembly or delivery state into a pre-fixation state, and can then be transitioned into a fixed state. In doing so, the fastening assembly 1 is sequentially transitioned from the pre-assembly or delivery state into the pre-fixation state in one movement by hand upon fastening in or on the body component 100, and then into the final fixed state.

In the process, the assembly 1 automatically/independently performs a tolerance compensation. This allows the fastening assembly 1 to also be usable for different sheet thicknesses of the body component 100, for example. Also, the fastening assembly 1 automatically balances tolerance deviations in the size and/or shape of the fastening opening 101 formed in the body component 100.

After fastening of the fastening assembly 1, it can be released from the fixed state by manipulation with a tool, in particular with a screwdriver.

The fastening assembly 1 substantially comprises a connecting element 3, which—as already stated—is preferably embodied as a plastic part, in particular an injection molded part. The connecting element 3 serves to provide a connection to the vehicle component 2 to be fastened, for example an interior grab handle.

In addition to the connecting element 3, the fastening assembly 1 comprises a retaining element 4, which is also preferably made of a plastic material, and in particular a plastic injection molded part. The retaining element 4 serves to hold the connecting element 3, to which the vehicle component 2 is connectable, to the body component 100.

The retaining element 4 substantially comprises a base body 5, which in turn comprises a retaining region 7 at a first end region of the base body 5.

The connecting element 3 likewise comprises a base body 6 with a receptacle opening 11, wherein or through which the retaining element 4, and in particular the retaining region 7 of the retaining element 4, is at least in some areas receivable/insertable.

As already stated, the assembly 1 can be transitioned from a pre-assembly or delivery state into a pre-fixation state. In the pre-assembly or delivery state of the assembly 1, the retaining region 7 of the retaining element 4 is not yet inserted through the fastening opening 101 in the body component 100.

In the pre-fixation state of the assembly 1, on the other hand, the retaining region 7 of the retaining element 4 is already inserted through the fastening opening 101 of the body component 100, and an edge region surrounding the fastening opening 101 of the body component 100 is at least in some areas accommodated between the retaining region 7 of the retaining element 4 and the base body 6 of the connecting element 3.

Here, it is expedient for a fitted region to be formed between the first end region of the base body 5, at which the retaining region 7 of the retaining element 4 is formed, and the opposite second end region of the base body 5, which fitted region is arranged in the pre-fixation state of the assembly 1 radially adjacent to the edge region surrounding the fastening opening 101 of the body component 100.

According to embodiments of the fastening assembly 1 according to the disclosure, the base body 5 of the retaining element 4 is preferably designed in order to be rotationally symmetrical at least in some areas.

It can further be seen in the exemplary embodiments of the assembly 1 according to the disclosure, shown schematically in the drawings, that a crown region 19, formed in particular to be annular at least in some areas, is formed at a second end region of the base body 5 opposite to the first end region of the base body 5 of the retaining element 4, wherein the aforementioned fitted region is formed between the crown region 19 and the retaining region 7.

When transitioning the assembly 1 from its pre-assembly or delivery state into its pre-fixation state, a torque is exerted on at least the retaining region 7 of the retaining element 4 such that, starting from a basic state of the retaining region 7, at least the retaining region 7 of the retaining element 4 is twisted in relation to the connecting element 3 and in relation to the fastening opening 101 of the body component 100 in order to allow a passage of the retaining region 7 through the fastening opening 101 of the body component 100.

After the passage of the retaining element 4 or retaining region 7 of the retaining element 4 through the fastening opening 101 of the body component 100, the torque previously exerted on the retaining region 7 is at least partially nullified, and the retaining region 7 is again in its basic state, i.e. in the rotational position in relation to the connecting element 3 and in relation to the fastening opening 101 of the body component 100, wherein the retaining region 7 is in the pre-assembly or delivery state of the assembly 1, that is to say before the retaining region 7 of the retaining element 4 has been inserted through the fastening opening 101 of the body component 100.

In other words, the fastening assembly 1 is designed such that the retaining element 4, in particular the retaining region 7 of the retaining element 4, can be twisted in relation to the connecting element 3 of the assembly 1 around an axis of rotation extending in the insertion direction of the retaining element 4.

In particular, the retaining element 4, in particular the retaining region 7 of the retaining element 4, can be twisted in relation to the connecting element 3 of the assembly 1 about an axis of rotation extending in the insertion direction of the retaining element 4 from a first rotational position of the retaining element 4 or retaining region 7 of the retaining element 4, wherein position the retaining element 4 is connectable to the connecting element 3 for putting together the assembly 1 (assembled state), into a second rotational position of the retaining element 4 or retaining region 7 of the retaining element 4, wherein position the retaining element 4 is connected to the connecting element 3 and wherein position the assembly 1 is in its pre-assembly or delivery state.

The second rotational position of the retaining region 7 of the retaining element 4 preferably corresponds to the aforementioned basic state of the retaining region 7, i.e. the rotational position of the retaining region 7 in relation to the connecting element 3 and in relation to the fastening opening 101 of the body component 100 in the pre-assembly or delivery state of the assembly 1.

The second rotational position of the retaining region 7 of the retaining element 4 is preferably also present when the assembly 1 is in its pre-fixation state.

In other words, in order to put together the assembly 1 and transition the assembly 1 into its pre-assembly or delivery state, the retaining element 4 is mounted to the connecting element 3 with the retaining region 7, namely by inserting the retaining element 4 onto the connecting element 3 and transitioning it from the first rotational position into the second rotational position in relation to the connecting element 3 in order to secure the retaining element 4 on the connecting element 3 (=assembled state).

After the assembly of the retaining element 4 on the connecting element 3, as a result of which the retaining element 4 is transitioned from the first rotational position into the second rotational position in relation to the connecting element 3, the assembly 1 is in the aforementioned pre-assembly or delivery state, wherein the retaining element 4 is temporarily fastened to the connecting element 3.

In the pre-assembly or delivery state, the assembly 1 is thus present as a (single) component consisting of the connecting element 3 and the retaining element 4 fastened thereto.

According to embodiments of the assembly 1 according to the disclosure, it is further provided that the retaining element 4 or retaining region 7 of the retaining element 4 can be further transitioned from the second rotational position into a third rotational position about the rotational axis extending in the insertion direction of the retaining element.

The retaining element 4 or retaining region 7 of the retaining element 4 is in the third rotational position when the retaining region 7 is inserted through the fastening opening 101 of the body component 100 upon transitioning the assembly from its pre-assembly or delivery state into its pre-fixation state.

According to design variants of the assembly 1 according to the disclosure, the assembly can furthermore be transitioned from its pre-fixation state into a fixed state, wherein the retaining region 7 of the retaining element 4 inserted through the fastening opening 101 of the body component 100 exerts a force, which acts on the edge region of the body component 100 surrounding the fastening opening 101 at least in some areas counter to the insertion direction, in order to fix the connecting element 3 to the body component 100.

In particular, it is provided here that, when the assembly 1 is in its pre-fixation state, i.e. when the retaining region 7 of the retaining element 4 is already inserted through the fastening opening 101 of the body component 100 and an edge region of the body component 100 surrounding the fastening opening 101 is received at least in some areas between the retaining region 7 of the retaining element 4 and the base body 6 of the connecting element 3, the assembly 1 is still movable in relation to the body component 100. In order to fix the assembly 1 without play, it is provided that the assembly 1 can be transitioned from its pre-fixation state into the fixed state.

In this context, it is conceivable that the retaining element 4 or retaining region 7 of the retaining element 4 can further be twisted in relation to the connecting element 3 about the rotational axis extending in the insertion direction of the retaining element 4, namely from the second rotational position, wherein the retaining element 4 or retaining region 7 of the retaining element 4 is in the pre-fixation state, into a fourth rotational position.

After the retaining area 7 of the retaining element 4 has passed through the fastening opening 101 of the body component 100, that is, after the retaining area 7 of the retaining element 4 has been inserted through the fastening opening of the body component, the retaining area 7 of the retaining element 4 skips back from the third rotational position into its second rotational position.

The rotational position of the retaining area 7 of the retaining element 4 in the pre-fixation state thus matches the rotational position of the retaining area 7 of the retaining element 4 in the pre-assembly or delivery state.

However, in the pre-fixation state, the edge region of the body component surrounding the fastening opening is accommodated between the retaining region 7 of the retaining element 4 and the base body 6 of the connecting element 3, at least in some regions.

In the fixed state of the assembly 1, the retaining portion 7 of the retaining element 4 is further rotated in relation to the connecting element 3 as compared to the pre-fixation state. In other words, in the fixed state of the assembly 1, the retaining element 4 or retaining region 7 of the retaining element 4 is in its fourth rotational position.

By further twisting the retaining region 7 of the retaining element 4 in relation to the connecting element 3, a force acting in the insertion direction is generated according to the leverage principle, resulting in the retaining element 4 being tensed against the connecting element 3, thereby causing a Z-axis compensation. Herein the Z-axis refers to the insertion direction of the assembly 1.

For example, it is conceivable that the retaining element 4, in particular the retaining region 7 of the retaining element 4, is associated with at least one in particular wedge-shaped or ramp-shaped clamping region 8, which, when the assembly 1 is transitioned into its fixed state, and in particular when the retaining element 4 is twisted from its second rotational position into its fourth rotational position, is rotated into an in particular gap-shaped region between the retaining element 4, and in particular the retaining region 7 of the retaining element 4, and the edge region of the body component surrounding the fastening opening 101 of the body component 100, namely by the exertion of a leverage effect.

On the other hand, it is preferred that the base body 6 of the connecting element 3 preferably comprises a base region 9, which is adapted preferably at least in some areas to the size and/or geometry of the fastening opening 101 of the body component 100, and which is accommodated at least in some areas in the fastening opening 101 of the body component 100 in the pre-fixation state and in the fixed state of the assembly 1.

In this context, it is advantageous in particular that the base region 9 is preferably designed to be elastically deformable at least in some areas in the insertion direction, in particular such that, when the in particular wedge-shaped or ramp-shaped clamping region 8 is twisted in, it is elastically deformed or deformable at least in some areas or partially due to the leverage effect exerted thereby.

As stated, the fastening assembly 1 according to the disclosure is characterized in particular by the fact that, during the fastening of the fastening assembly 1 on a body component 100, the retaining element 4, in particular the retaining region 7 of the retaining element 4, is twisted in relation to the connecting element 3, enabling the passage of the retaining region 7 of the retaining element 4 through the fastening opening 101 of the body component 100 in the first place.

After the retaining region 7 of the retaining element 4 has passed through the fastening opening 101, the retaining region 7 of the retaining element 4 springs back again.

A further twisting of the retaining region 7 in relation to the connecting element 3 then serves, under exertion of a leverage effect, so that the retaining element 4 is tensed in relation to the connecting element 3 and the body component received between the retaining element 4 and the connecting element 3.

In order to be able to cause this desired rotational movement of the retaining element 4, in particular the retaining region 7 of the retaining element 4, in relation to the connecting element 3 upon fastening of the assembly 1, the retaining region 7 of the retaining element 4 is preferably designed to be slightly conical and tapering in the insertion direction, wherein the retaining region 7 of the retaining element 4 preferably comprises a plurality of in particular outer-peripheral guiding surfaces 12, which are formed in order to generate a torque for twisting the retaining region 7 out of its basic state when transitioning the assembly 1 from its pre-assembly or delivery state into its pre-fixation state and when the retaining region 7 is inserted into the fastening opening 101 of the body component 100 in the insertion direction in relation to the body component 100.

As indicated in the drawings, the outer-peripheral guiding surfaces 12 of the retaining region 7 are preferably designed in a helical fashion in order to generate a corresponding torque when the retaining region 7 is inserted into the fastening opening 101, in order to rotate the retaining region 7.

Figure 5:
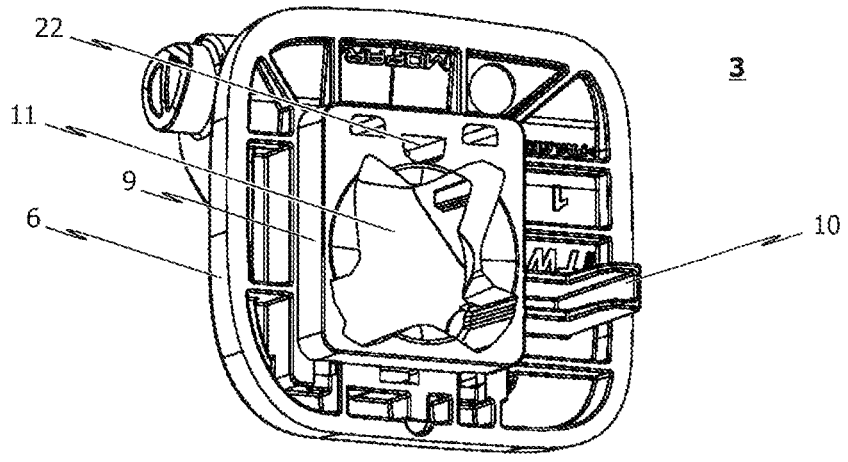
FIG. 5 illustrates, schematically and in an isometric view, the connecting element of the exemplary embodiment of the assembly according to the disclosure according to FIG. 2.
Figure 6:
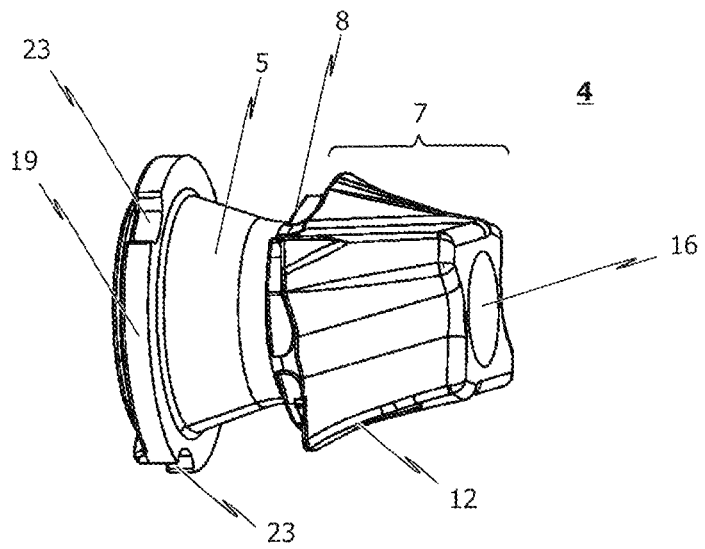
FIG. 6 illustrates, schematically and in an isometric view, the retaining element of the exemplary embodiment of the assembly according to the disclosure according to FIG. 2.

In particular, it can be seen from the illustration in FIG. 5 that the connecting element 3 preferably comprises at least one alignment means 10 in the form of a projection, which serves to align the connecting element 3, and in particular the base body 6 of the connecting element 3, in relation to the fastening opening 101, and to position it accordingly. The alignment means 10 of the connecting element 3 is in particular guided through a corresponding (further) opening in the body component 100 and thus serves to pre-fix/pre-position the base body 6 of the connecting element 3.

The retaining area 7 of the retaining element 4 preferably comprises a geometry, in particular a cross-sectional geometry, and/or size that is adapted with respect to the fastening opening 101 of the body component 100 such that, in the alignment state with respect to the fastening opening 101 of the body component 100, the retaining area 7 of the retaining element 4 can be inserted through the fastening opening 101 of the body component 100 only in the state wherein it is twisted from the basic state.

According to the fastening assembly 1 according to the disclosure, it is provided that it further comprises a locking and/or blocking element 13, which is also preferably formed from a plastic material, in particular in the course of a plastic injection molding process.

The locking and/or blocking element 13 serves in particular to determine a position of the retaining element 4 in relation to the connecting element 3.

Figure 4:
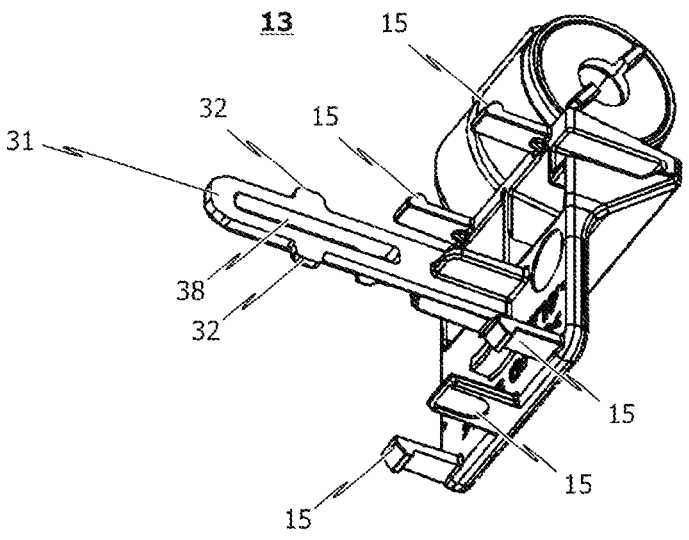
FIG. 4 illustrates, schematically and in an isometric view, the locking and/or blocking element of the assembly according to FIG. 2.

As can be seen, for example, from the illustration in FIG. 4, the locking and/or blocking element 13 comprises a land region 31 extending in the direction of insertion, the land region 31 preferably having two finger and/or wing elements 32 opposite to one another and projecting radially from the land region 31.

On the other hand, the base body 5 of the retaining element 4 comprises a passage 16 extending in the longitudinal direction of the base body 5, wherein the land region 31 of the locking and/or blocking element 13 is received or receivable at least partially or in some areas with the finger or wing elements 32 projecting from the land region 31.

The passage 16 of the base body 5 of the retaining element 4 comprises a first guide system 33, which is formed to guide the finger or wing elements 32 of the locking and/or blocking element 13 when inserting the land region 31 into the passage 16 of the base body 5 of the retaining element 4.

Furthermore, the passage 16 of the base body 5 of the retaining element 4 comprises a second guide system 34, which is formed to guide the finger or wing elements 32 of the locking and/or blocking element 13 when the land region 31 is guided out of the passage 16 of the base body 5 of the retaining element 4.

In particular, the first guide system 33 comprises two interior groove regions opposite to one another and embodied in the inner wall of the passage 16 of the base body 5 of the retaining element 4, wherein one of the two finger or wing elements 32 of the locking and/or blocking element 13 is received at least partially or in some areas Likewise, the second guide system 34 comprises two interior groove regions opposite to one another, which are embodied in the inner wall of the passage 16 of the base body 5 of the retaining element 4, wherein one of the two finger or wing elements 32 of the locking and/or blocking element 13 is receivable at least partially or in some areas.

Figure 15:
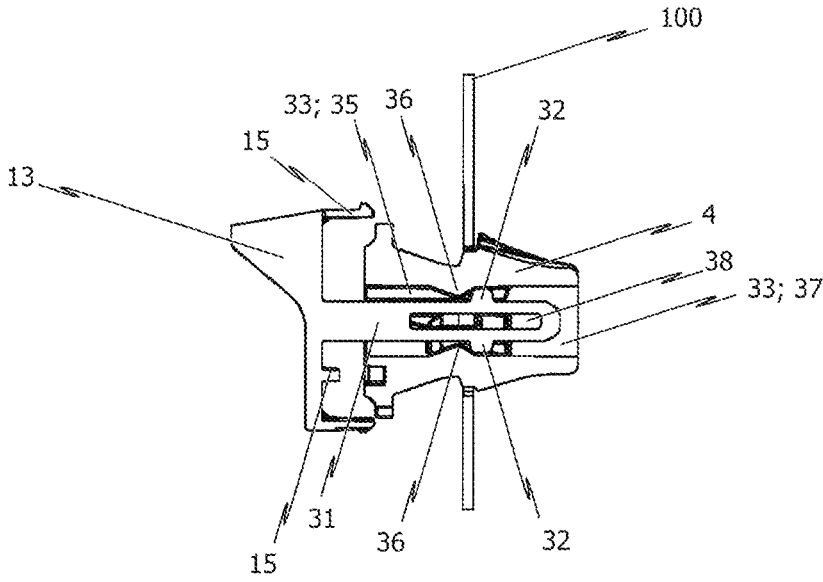
FIG. 15 illustrates, schematically and in a sectional view, the retaining element and the locking and/or blocking element of the assembly according to FIG. 14.
Figure 16:
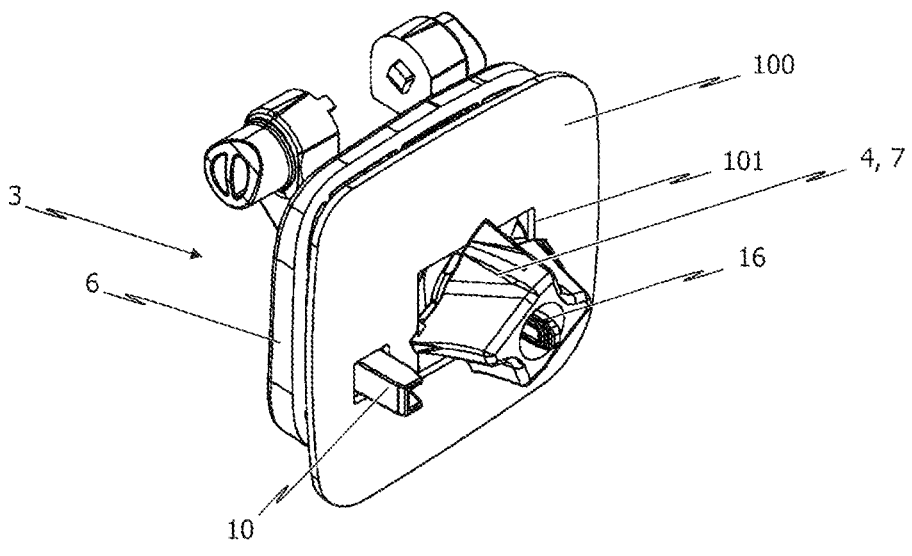
FIG. 16 illustrates, schematically and in an isometric view, the assembly according to FIG. 13; namely, in a state wherein the assembly is in its (final) fixed state.
Figure 17:
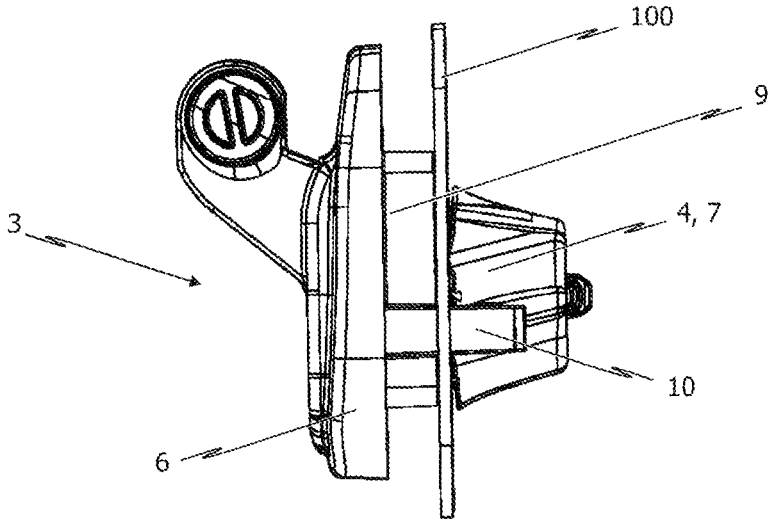
FIG. 17 illustrates, schematically and in a side view, the assembly according to FIG. 16.
Figure 18:
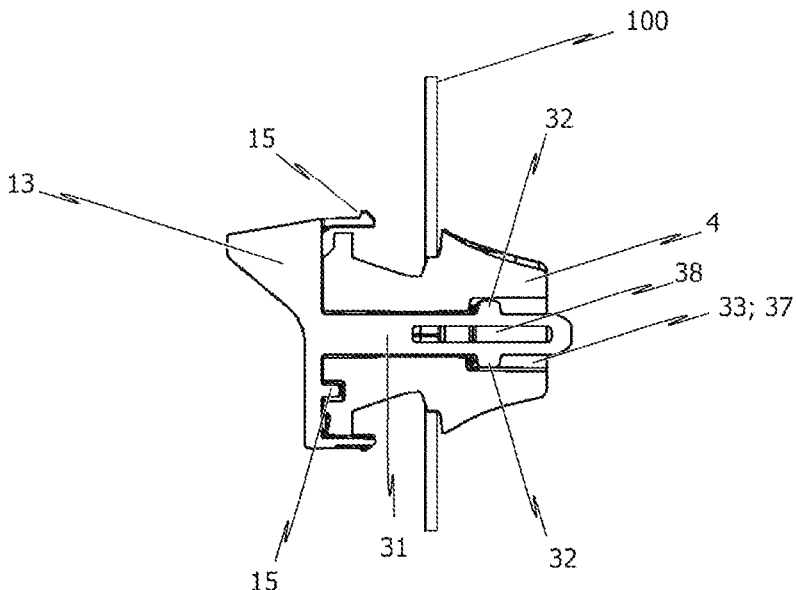
FIG. 18 illustrates, schematically and in a cross-sectional view, the retaining element and the locking and/or blocking element of the assembly according to FIG. 17.
Figure 19:
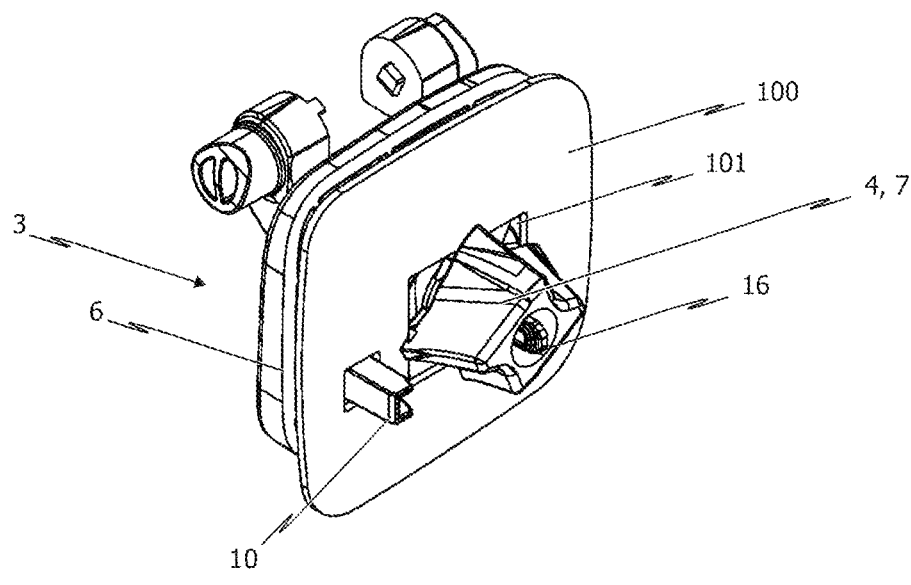
FIG. 19 illustrates, schematically and in an isometric view, the assembly according to FIG. 16; namely, in a state wherein the assembly is disassembled again.
Figure 20:
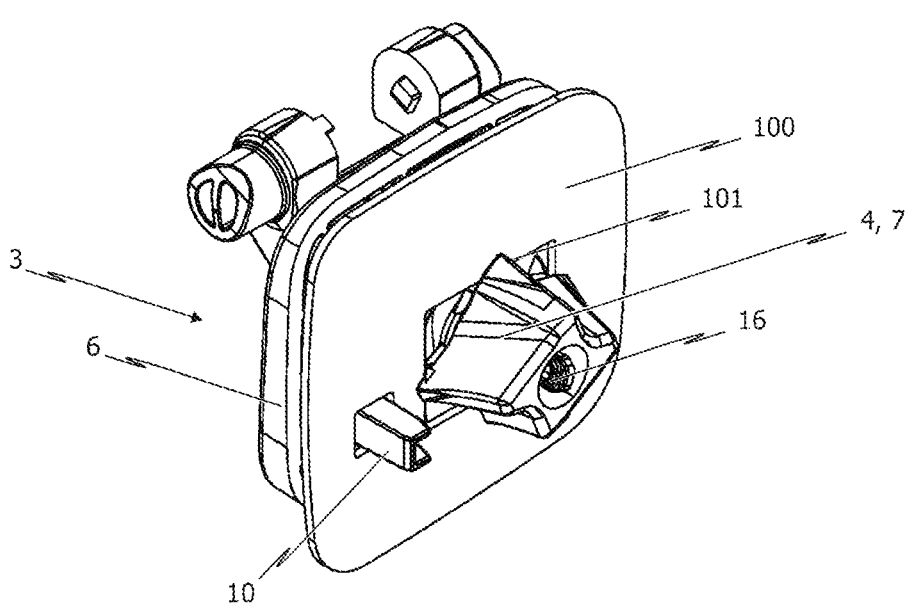
FIG. 20 illustrates, schematically and in an isometric view, the assembly according to FIG. 19; namely, in a state wherein the assembly is further disassembled.

For example, as can be seen from the sectional view in FIG. 15, the first guide system 33 comprises a first region 35 and a second region 37 that is connected to the first region 35 via a projection 36 that is provided in the first guide system 33. The first and second regions 35, 37 as well as the projection 36 of the first guide system 33 are arranged such that, when inserting the land region 31 into the passage 16 of the base body 5 of the retaining element 4, the two finger or wing elements 32 of the locking and/or blocking element 13 first follow the guide of the first region 35 of the first guide system 33, wherein, in order to transition into the second region 37 of the first guide system 33, the finger or wing elements 32 of the locking and/or blocking element 13 must be moved radially inwards with respect to the land region 31.

Herein the land region 31 is elastically formed in particular in the region of the two finger or wing elements 32 such that, in order to overcome the projection 36 between the first and second regions 35, 37 of the first guide system 33, the two finger and or wing elements 32 can be moved radially towards each other as viewed with respect to the extension direction of the land region 31.

The second guide system 34, on the other hand, is embodied in one of the interior groove regions without a projection.

In order to be able to implement the elasticity of the land region 31, it is provided in the embodiment shown in the drawings that the land region 31 comprises a window region 38, in particular in the region of the two finger or wing elements 32.

Figure 21:
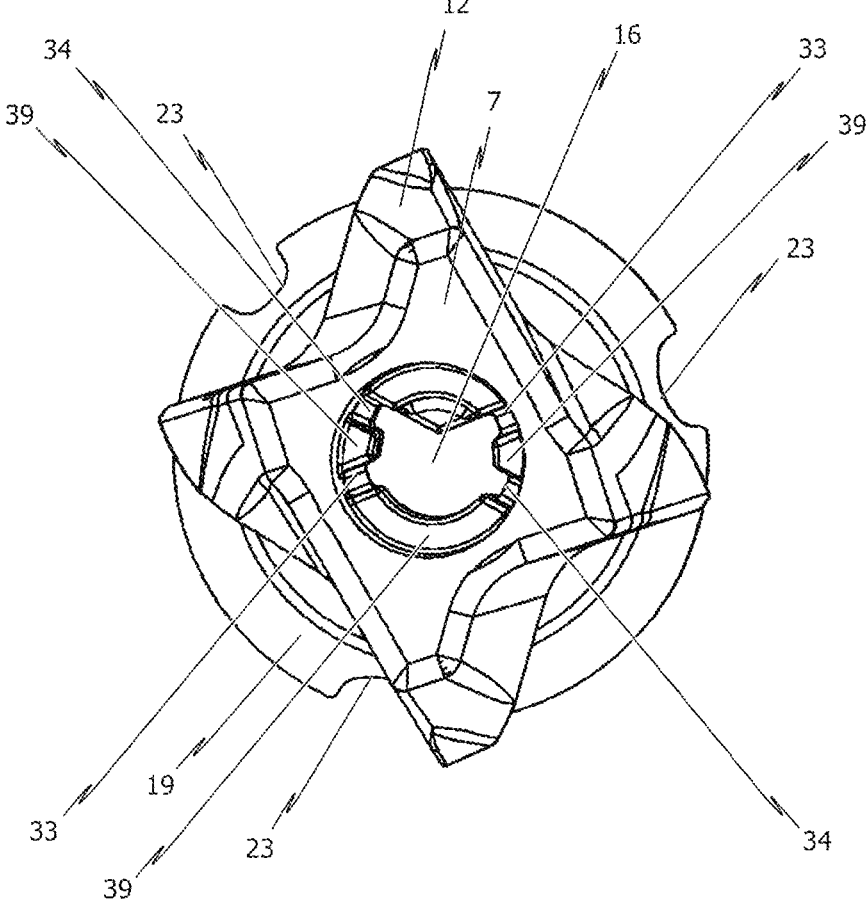
FIG. 21 illustrates, schematically and in a top view, the exemplary embodiment of the assembly according to the disclosure according to FIG. 2, however without the locking and/or blocking element.
Figure 22A:
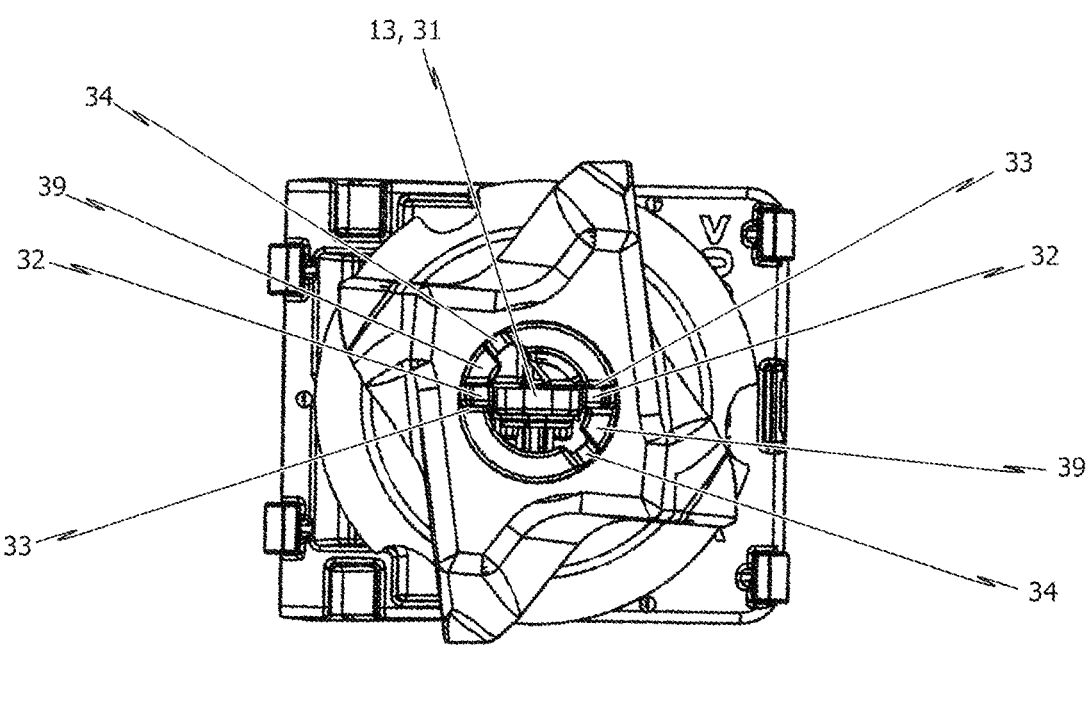
FIG. 22*a* illustrates, schematically and in a top view, the exemplary embodiment of the assembly according to FIG. 2, wherein the assembly is in its pre-assembly or delivery state.
Figure 22B:
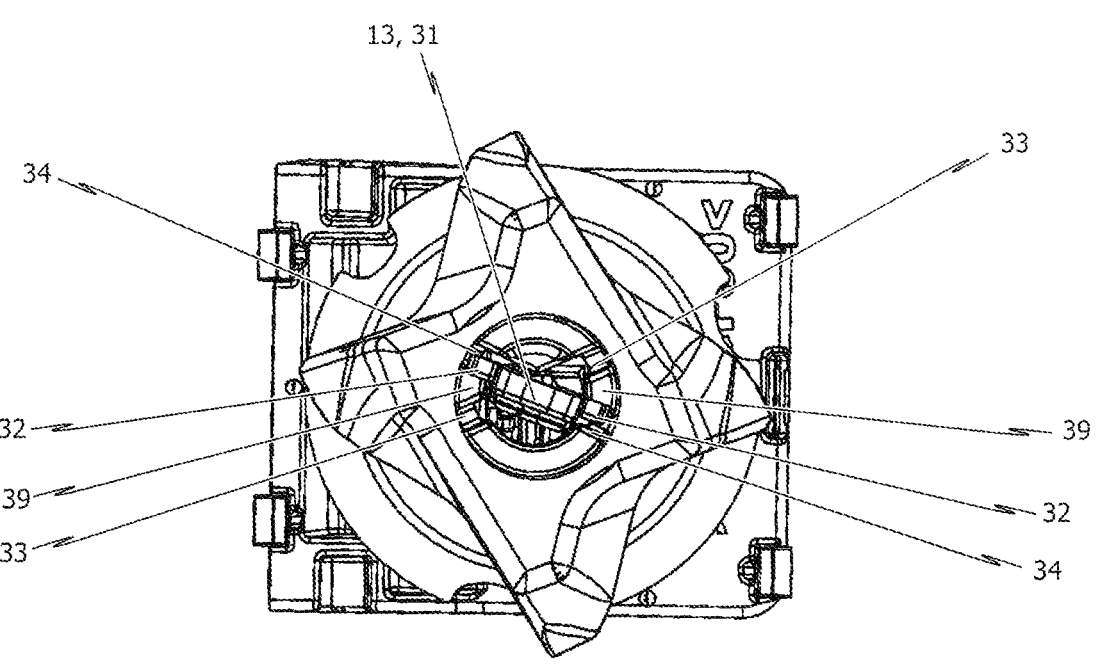
FIG. 22*b* illustrates, schematically and in a top view, the exemplary embodiment of the assembly according to FIG. 2, wherein the assembly is in its disassembled state.

The top view in FIG. 21 shows that the first guide system 33 of the passage 16 of the base body 5 of the retaining element 4 is connected to the second guide system 34 of the passage 16 of the base body 5 of the retaining element 4 via a bevel 39 that is inclined towards the interior groove regions of the second guide system 34. This bevel 39, during the transition of the finger or wing elements 32 of the locking and/or blocking element 13 from the first guide system 33 to the second guide system 34, guides the finger or wing elements 32 with simultaneous torsion of the land area 31 of the locking and/or blocking element 13.

In the pre-assembly or delivery state of the assembly, the finger or wing elements 32 of the locking and/or blocking element 13 are located in the first region 35 of the first guide system 33. When transitioning the assembly from its pre-fixation state to the fixed state, the finger or wing elements 32 pass the projection 36 between the first and second regions 35, 37 of the first guide system 33.

Figure 7:
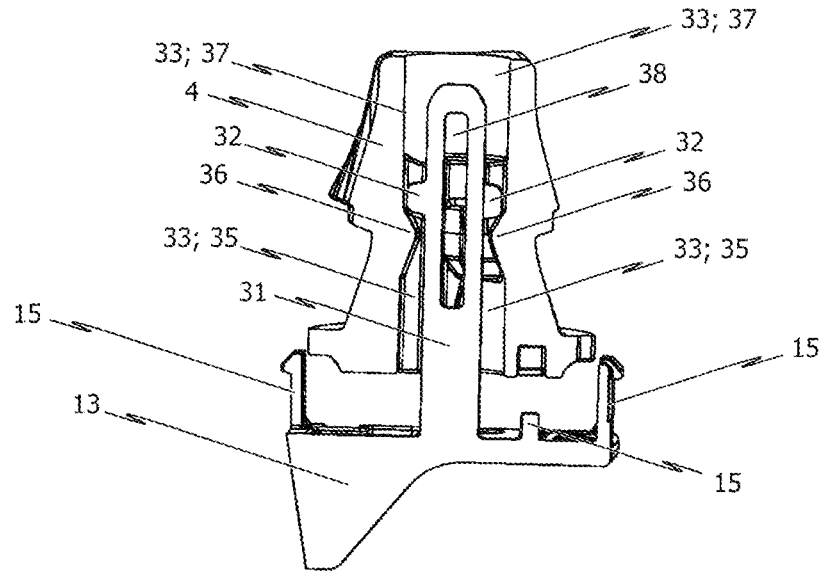
FIG. 7 illustrates, schematically and in a cross-sectional view, the locking and/or blocking element and the retaining element of the exemplary embodiment of the assembly according to FIG. 2, namely in a state wherein the assembly is in a pre-assembly or delivery state.
Figure 8:
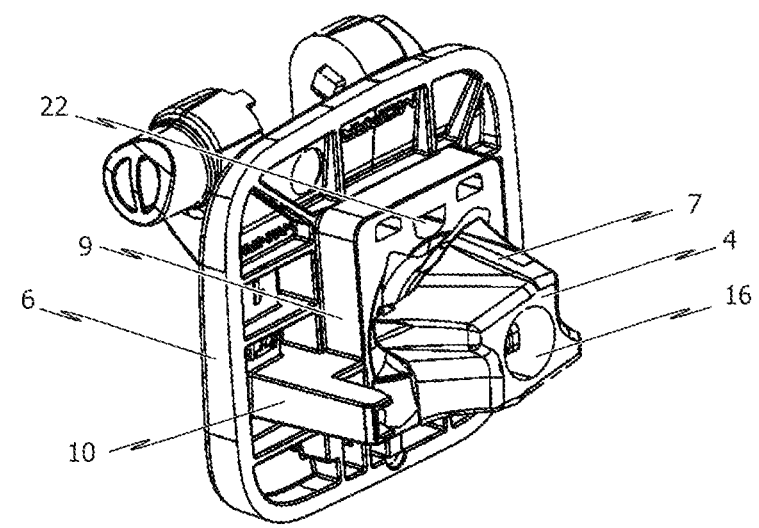
FIG. 8 illustrates, schematically and in an isometric view, the exemplary embodiment of the assembly according to the disclosure according to FIG. 2 in a pre-assembly or delivery state.
Figure 9:
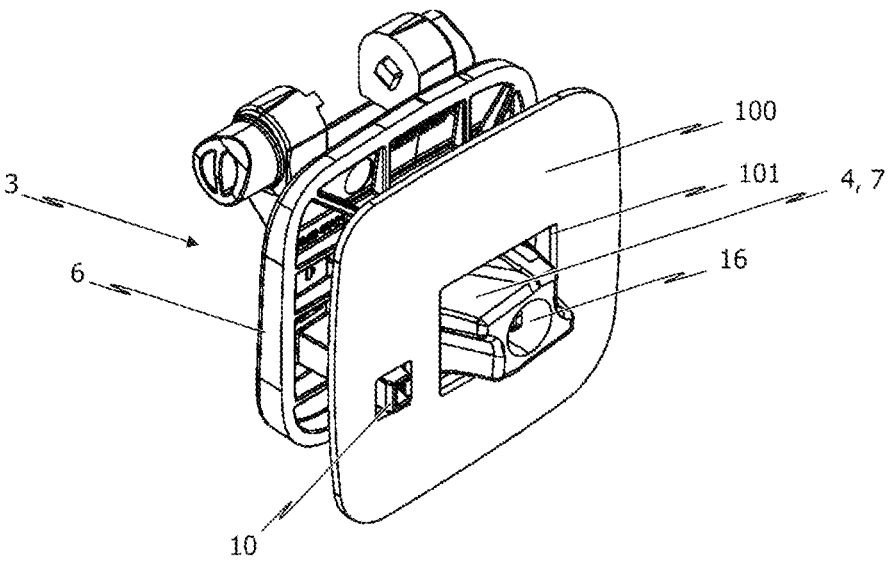
FIG. 9 illustrates, schematically and in an isometric view, the assembly according to FIG. 8, namely before the retaining element is inserted through an opening arranged in a body component.
Figure 10:
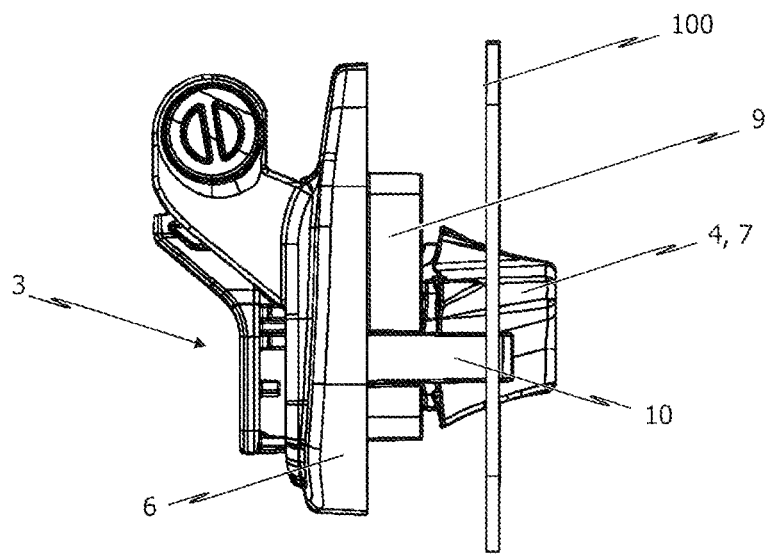
FIG. 10 illustrates, schematically and in a side view, the assembly according to FIG. 9.
Figure 11:
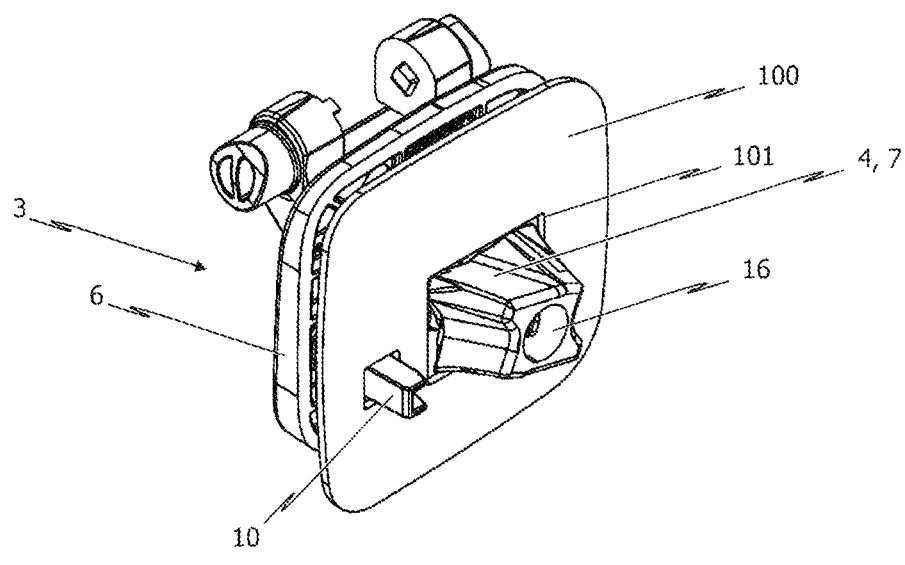
FIG. 11 illustrates, schematically and in an isometric view, the assembly according to FIG. 9; namely, in a state wherein the retaining element is further inserted into the opening provided in the body component.
Figure 12:
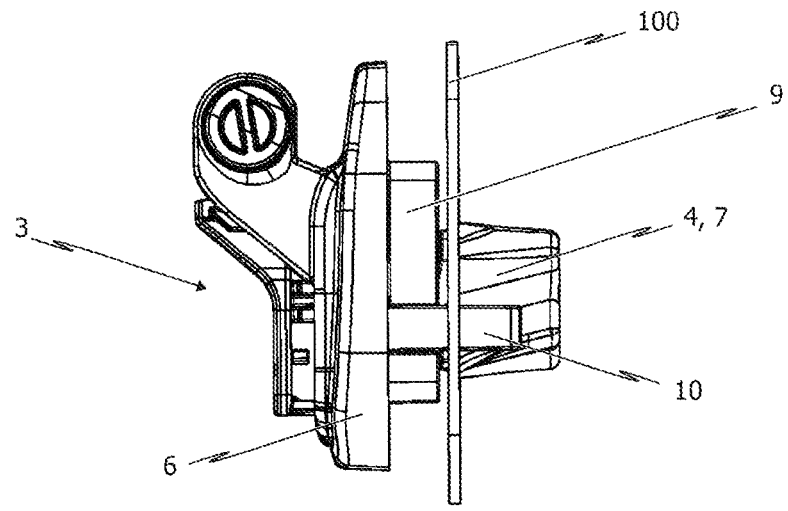
FIG. 12 illustrates, schematically and in a side view, the assembly according to FIG. 11.
Figure 13:
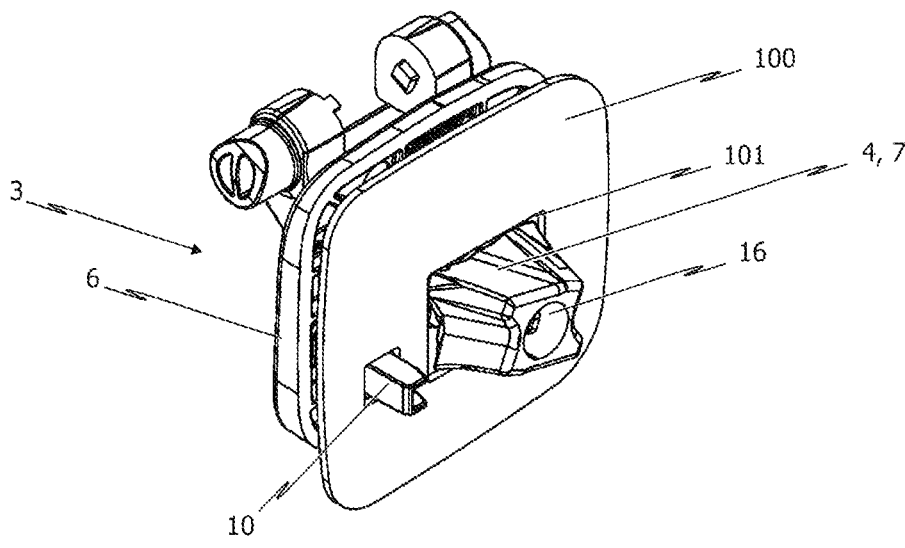
FIG. 13 illustrates, schematically and in an isometric view, the assembly according to FIG. 11; namely, in a state after the retaining element is fully inserted through the opening provided in the body element and the assembly is in its pre-fixation state.
Figure 14:
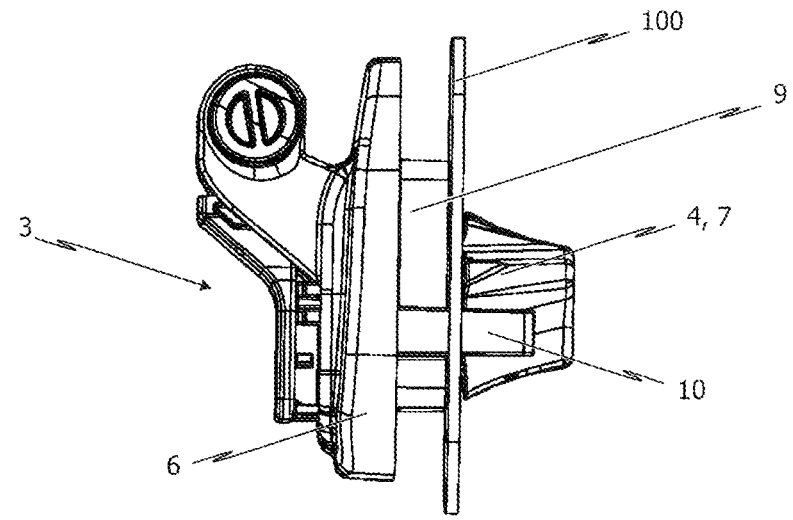
FIG. 14 illustrates, schematically and in a side view, the assembly according to FIG. 13.

In particular, the illustration in FIG. 7 shows that the locking and/or blocking element 13 can comprise blocking and/or locking means 15 in order to preferably releasably lock the locking and/or blocking element 13 at least in its second state, or to block the locking and/or blocking element 13 against twisting in the fixed state of the assembly.

The locking process preferably takes place in the base body 6 of the connecting element 3.

At least in the fixed state of the assembly, the retaining element 4 is connected to the connecting element 3 via a total of at least four regions. This allows an in particular good and even force distribution.

After fastening of the fastening assembly 1, it can be released from the fixed state by manipulation with a tool, in particular with a screwdriver. For this purpose, for example, an opening 22 can be formed in the base region 9 of the base body 6 of the connecting element 3, through which the tool can be guided in order to release the fixed state of the assembly 1.

The disclosure is not limited to the embodiments specifically shown in the drawings, but rather arises from a consideration of all features described in connection with the torsion fastening clip according to the disclosure.

What is claimed is:

1. An assembly for providing a fastening possibility for a vehicle component to a body component, wherein the assembly is embodied as a torsion clip and comprises the following:

a connecting element to which the vehicle component is connectable; and a retaining element for retaining the connecting element on the body component;

wherein the retaining element comprises a base body with a retaining region at a first end region of the base body, and the connecting element comprises a base body with a receptacle opening wherein the retaining element is receivable at least in some areas, or through which the retaining element, and the retaining region of the retaining element, is insertable at least in some areas, wherein the assembly further comprises a locking or blocking element for defining a location or position of the retaining element in relation to the connecting element, wherein the locking or blocking element comprises a land region extending in an insertion direction, wherein the land region comprises two finger or wing elements that are opposite to one another and projecting radially from the land region, wherein the base body of the retaining element comprises a passage extending in a longitudinal direction of the base body or a recess extending in the longitudinal direction of the base body, wherein a land region of the locking or blocking element is received or receivable at least partially or in some areas with the finger or wing elements projecting from the land region, wherein the passage or the recess of the base body of the retaining element comprises a first guide system, which is formed to guide the finger or wing elements of the locking or blocking element when inserting the land region into the passage or into the recess of the base body of the retaining element, and wherein the passage or recess of the base body of the retaining element comprises a second guide system, which is formed so as to guide the finger or wing elements of the locking or blocking element when the land region is guided out of the passage or out of the recess of the base body of the retaining element.

2. The assembly according to claim 1, wherein the first guide system comprises two interior groove regions opposite to one another, which are embodied in an inner wall of the passage or in the inner wall of the recess of the base body of the retaining element, wherein at least one of the two finger or wing elements of the locking or blocking element is receivable; and/or wherein the second guide system comprises two interior groove regions opposite to one another and embodied in the inner wall of the passage or in the inner wall of the recess of the base body of the retaining element, wherein one of the two finger or wing elements of the locking or blocking element is respectively receivable, at least partially or in some areas.

3. The assembly according to claim 2, wherein the first guide system comprises a first region and a second region connected to the first region via a projection provided in the first guide system, wherein the first and second regions as well as the projection of the first guide system are formed such that when the land region is inserted into the passage or into the recess of the base body of the retaining element, the two finger or wing elements of the locking or blocking element first follow the guide of the first region of the first guide system, wherein, for transitioning into the second region of the first guide system, the finger or wing elements of the locking or blocking element must move radially inwards with respect to the land region.

4. The assembly according to claim 3, wherein the land region is elastically formed such that the two finger or wing elements move radially towards one another.

5. The assembly according to claim 4, wherein the second guide system is embodied without a projection in one of the interior groove regions.

6. The assembly according to claim 1, wherein the land region comprises a window area in the area of the two finger or wing elements.

7. The assembly according to claim 2, wherein the first guide system of the passage or the recess of the base body of the retaining element is connected to the second guide system of the passage or the recess of the base body of the retaining element via a bevel inclined in a direction of the interior groove regions of the second guide system, via which, during transition of the finger or wing elements of the locking or blocking element from the first guide system to the second guide system, the finger or wing elements of the locking or blocking element are guided with simultaneous torsion of the land region of the locking or blocking element.

8. The assembly according to claim 1, wherein the assembly can be transitioned from a pre-assembly or delivery state, wherein the retaining region of the retaining element is not yet inserted through a fastening opening in the body component, into a pre-fixation state, wherein the retaining region of the retaining element is inserted through the fastening opening of the body component and an edge region of the body component surrounding the fastening opening is received at least in some areas between the retaining region of the retaining element and the base body of the connecting element, wherein, in order to transition the assembly from its pre-assembly or delivery state into its pre-fixation state, a torque is exerted on at least the retaining region of the retaining element such that, starting from a basic state of the retaining region, at least the retaining region of the retaining element is twisted in relation to the connecting element and in relation to the fastening opening of the body component in order to allow a passage of the retaining region through the fastening opening of the body component, wherein, after the passage of the retaining element or retaining region of the retaining element through the fastening opening of the body component, the torque previously exerted on the retaining region is at least partially nullified, and the retaining region is in its basic state again.

9. The assembly according to claim 8, wherein the retaining element or retaining region of the retaining element can be twisted in relation to the connecting element around a rotational axis extending in an insertion direction of the retaining element, namely:

from a first rotational position of the retaining element or retaining region of the retaining element, wherein the retaining element is connectable to the connecting element for assembling the assembly, into a second rotational position of the retaining element or retaining region of the retaining element, wherein the retaining element is connected to the connecting element and the assembly is in its pre-assembly or delivery state or in its pre-fixation state; and from the second rotational position of the retaining element or retaining region of the retaining element into a third rotational position of the retaining element or retaining region of the retaining element, wherein the retaining element is located when the retaining region passes through the fastening opening of the body component.

10. The assembly according to claim 9, wherein the assembly can furthermore be transitioned from its pre-fixation state into a fixed state, wherein the retaining region of the retaining element inserted through the fastening opening of the body component exerts a force, which acts on the edge region of the body component surrounding the fastening opening opposite the insertion direction at least in some areas, in order to fix the connecting element to the body component.

11. The assembly according to claim 9,
wherein, in order to transition the assembly from its pre-fixation state into its fixed state, the retaining element or retaining region of the retaining element is further twisted from its second rotational position in relation to the connecting element into a fourth rotational position.

12. The assembly according to claim 11,
wherein the locking or blocking element can be transitioned from a first state, wherein the assembly is in its pre-assembly or delivery state, into a second state, wherein the assembly is in its fixed state,
wherein, in the first state of the locking or blocking element, it blocks a transition of the retaining element from the second rotational position into the first rotational position, and wherein, upon transitioning the locking or blocking element into its second state, an engagement of a torsion element with a helical groove of the retaining element is released, and the retaining element is twisted from its second rotational position into its fourth rotational position,
wherein the locking or blocking element comprises at least one latching means for releasably latching the locking or blocking element at least in its second state.

13. The assembly according to claim 12,
wherein the assembly comprises at least one element which, when the locking or blocking element is transitioned from its first state to its second state, is formed to translate a movement of the locking or blocking element relative to the connecting element into a rotational movement of the retaining element relative to the connecting element in order to transition the retaining element into its fourth rotational position.

14. The assembly according to claim 8,
wherein the base body of the retaining element is arranged in a rotationally symmetrical manner at least in some areas, wherein a crown region is formed at a second end region of the base body opposite the first end region of the base body, and wherein a fitted region is formed between the crown region and the retaining region, and
wherein the base body of the connecting element comprises a support surface adapted to a geometry or size of the crown region at least in some areas, such that, at least in the pre-assembly or delivery state of the assembly and, in the pre-fixation state of the assembly, the crown region of the retaining element rests on the support surface of the connecting element at least in some areas.

15. The assembly according to claim 14,
wherein at least one recess is formed in the crown region of the retaining element, and wherein the connecting element comprises a region which is formed to be complementary to the at least one recess of the crown region at least in some areas, and projects in the direction of the receptacle opening of the connecting element, which is formed such that, in the first rotational position of the retaining element, the retaining element can be connected to the connecting element, so that the crown region of the retaining element then rests on the support surface of the connecting element, at least in some areas,
wherein the at least one region protruding in the direction of the receptacle opening of the connecting element is arranged at an offset from the plane wherein the crown region of the retaining element is located, such that the at least one region protruding in the direction of the receptacle opening of the connecting element blocks a release of the connection between the retaining element and the connecting element in the second rotational position of the retaining element.

\* \* \* \* \*